April 19, 1927.

C. W. E. CLARKE

SOOT BLOWER CONNECTION

Filed March 8, 1923

1,624,927

Inventor
Charles W. E. Clarke
By his Attorney

Patented Apr. 19, 1927.

1,624,927

UNITED STATES PATENT OFFICE.

CHARLES W. E. CLARKE, OF NEW YORK, N. Y.

SOOT-BLOWER CONNECTION.

Application filed March 8, 1923. Serial No. 623,626.

This invention relates to boiler tube cleaning apparatus of the character used in modern boiler installations and commonly known as "soot blowers."

Apparatus of this character is well known and usually comprises a flexible hose connection between the soot blower head and the steam supply pipe. After an apparatus of this character has been in use for a time there is danger that the bending of the flexible hose will so weaken some portion of the wall thereof that it will rupture and thus permit the escape of live steam at high pressure. Steam so escaping may severely scald, or even kill, a person working in the immediate vicinity. It is the chief object of the present invention, therefore, to advise a thoroughly practical means for preventing an accident of this character.

The nature of the invention will be readily understood from the following description when read in connection with the accompanying drawings, and the novel features will be particularly pointed out in the appended claims.

Referring now to the drawings.

Figure 1:
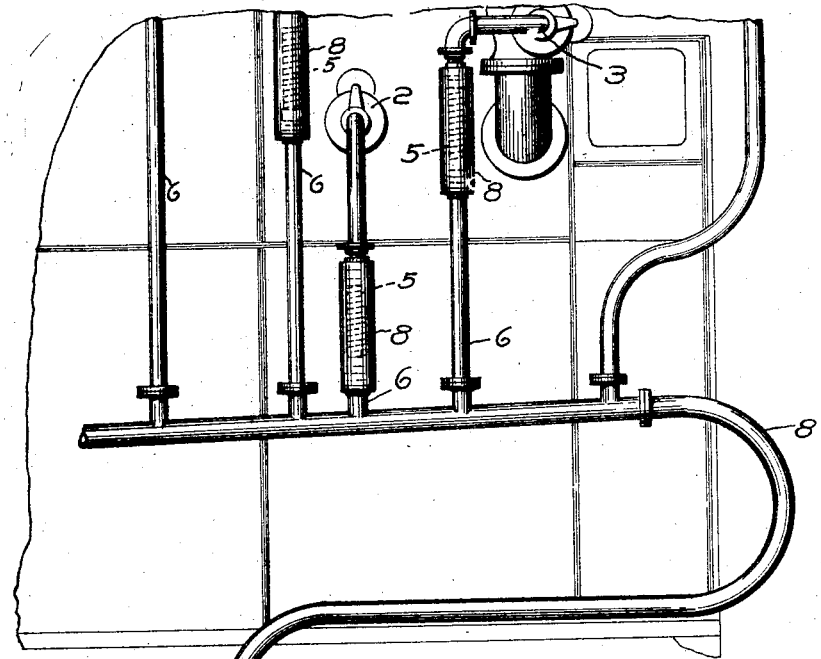
Figure 1 is a front elevation of a portion of the boiler showing the steam supply pipe for the soot blowers and several soot blower connections leading from this pipe.

In the drawings, 2 and 3 designate soot blower heads connected through flexible hose members 5—5, and pipes 6—6 to another pipe 8 which supplies steam to a series of these soot blowers.

Figure 2:
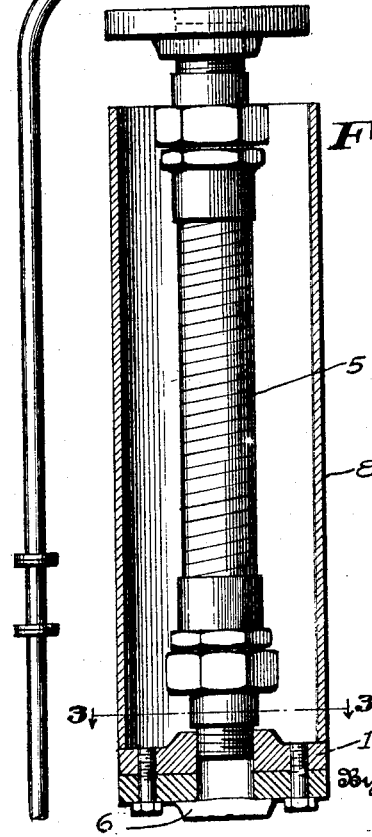
Fig. 2 is a longitudinal cross sectional view of the guard or safety device provided by this invention.
Figure 3:
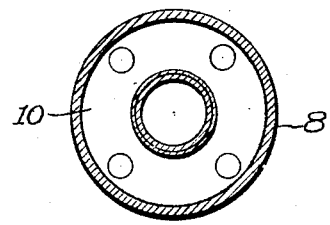
Fig. 3 is a cross sectional view on the line 3—3, Fig. 2.

Referring more particularly to Figs. 2 and 3 it will be seen that the flexible hose 5 is enclosed in a metal pipe 8 which is considerably larger in diameter than the hose so that the hose can have limited freedom of movement relatively to the pipe. When the hose extends vertically, the pipe 8 simply rests loosely on the lower hose fitting 10. Since the pipe is loosely supported, it can move freely with the hose so that the soot blower head has all the freedom of movement when the guard 8 is used that it would have if the guard were not employed.

If the hose 5 should burst, the escaping steam would strike the inner walls of the pipe 8 and flow toward both ends, the pressure of the steam striking one wall of the pipe serving to move the pipe sufficiently to provide an escape at the lower end thereof. Any direct lateral escape of the steam from the hose, however, is effectually cut off, so that the danger of an attendant in the immediate vicinity being seriously scalded is practically eliminated.

In case the hose is located horizontally, the pipe 8 simply rests on the hose coupling nuts.

The invention thus provides a very simple but exceedingly effective guard for preventing injuries which otherwise are likely to occur when a flexible hose carrying high pressure steam is ruptured. The cost of the guard is negligible and it may be installed at a trifling expense. Furthermore, it does not interfere in the slightest degree with the normal operation of the soot blower or its connections.

Having thus described my invention, what I desire to claim as new is:

1. In a soot blowing apparatus, the combination of devices for conducting steam including a flexible hose, and a rigid guard located adjacent and laterally of the normal position of an operator and through which said hose extends loosely, said guard being loosely mounted, whereby said guard and hose are movable relatively to each other.

2. A soot blowing apparatus comprising a section of flexible hose and a guard encircling and substantially coextensive with said section and mounted to permit independent movement of said guard and section.

3. In a soot blowing apparatus, the combination of a soot blower head, a steam supply pipe, a flexible hose connecting said head with said pipe, said hose including a section extending upwardly from said pipe, and a shield encircling and substantially coextensive with said section, mounted to permit independent movement of said shield and section.

CHARLES W. E. CLARKE.